US011469480B2

(12) United States Patent
Kim (10) Patent No.: US 11,469,480 B2
(45) Date of Patent: Oct. 11, 2022

(54) CYLINDRICAL SECONDARY BATTERY CONFIGURED TO PREVENT OVERCHARGE THEREOF

(71) Applicant: LG CHEM, LTD., Seoul (KR)

(72) Inventor: Kyung Min Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/642,732

(22) PCT Filed: Jan. 29, 2019

(86) PCT No.: PCT/KR2019/001208
§ 371 (c)(1),
(2) Date: Feb. 27, 2020

(87) PCT Pub. No.: WO2019/231071
PCT Pub. Date: Dec. 5, 2019

(65) Prior Publication Data
US 2021/0074987 A1    Mar. 11, 2021

(30) Foreign Application Priority Data

May 30, 2018  (KR) ........................ 10-2018-0061573

(51) Int. Cl.
*H01M 50/543*  (2021.01)
*H01M 50/166*  (2021.01)
(Continued)

(52) U.S. Cl.
CPC ..... *H01M 50/538* (2021.01); *H01M 10/0431* (2013.01); *H01M 50/155* (2021.01);
(Continued)

(58) Field of Classification Search
CPC ............ H01M 50/538; H01M 50/543; H01M 50/155; H01M 50/166; H01M 10/0431;
(Continued)

(56) References Cited

U.S. PATENT DOCUMENTS 6,548,204 B1    4/2003  Kim et al.
8,029,926 B2   10/2011  Kim
(Continued)

FOREIGN PATENT DOCUMENTS

CN    1606183 A    4/2005
CN   203562472 U   4/2014
(Continued)

OTHER PUBLICATIONS

Horiuchi, Masayuki, JP-11176614-A (machine translation of description), 1999 (Year: 1999).*
(Continued)

*Primary Examiner* — Jonathan Crepeau
(74) *Attorney, Agent, or Firm* — Birch, Stewart, Kolasch & Birch, LLP (57) ABSTRACT

A cylindrical secondary battery configured to have a structure to which an adhesion unit, including an adhesive material, a conductive material, and PTC particles, is provided. The adhesion unit is configured to couple a cap assembly, which functions as a positive electrode terminal of the cylindrical secondary battery, and a positive electrode tab of a jelly-roll type electrode assembly to each other.

12 Claims, 5 Drawing Sheets

(51) Int. Cl.
*H01M 10/04* (2006.01)
*H01M 50/572* (2021.01)
*H01M 50/581* (2021.01)
*H01M 10/0587* (2010.01)
*H01M 50/342* (2021.01)
*H01M 50/538* (2021.01)
*H01M 50/155* (2021.01)

(52) U.S. Cl.
CPC ..... *H01M 50/166* (2021.01); *H01M 50/3425* (2021.01); *H01M 50/543* (2021.01); *H01M 50/572* (2021.01); *H01M 50/581* (2021.01); *H01M 10/0587* (2013.01); *H01M 2200/106* (2013.01)

(58) Field of Classification Search
CPC ......... H01M 10/637; H01M 2200/106; H01M 10/123; H01M 50/572–583
See application file for complete search history.

(56) References Cited

U.S. PATENT DOCUMENTS

| | | | |
|---|---|---|---|
| 2005/0079422 | A1 | 4/2005 | Ko et al. |
| 2007/0020509 | A1 | 1/2007 | Kim |
| 2012/0034513 | A1* | 2/2012 | Kim .................... H01M 50/528 429/186 |
| 2013/0196182 | A1 | 8/2013 | Tanaka et al. |
| 2016/0240836 | A1* | 8/2016 | Aotani ................ H01M 50/581 429/61 |
| 2017/0194619 | A1 | 7/2017 | Kim |

FOREIGN PATENT DOCUMENTS

| | | | | |
|---|---|---|---|---|
| CN | 105594019 | A | | 5/2016 |
| EP | 2 475 026 | A1 | | 7/2012 |
| JP | 11-176614 | A | | 7/1999 |
| JP | 2004-193193 | A | | 7/2004 |
| JP | 2008-53652 | A | | 3/2008 |
| JP | 2010-73847 | A | | 4/2010 |
| KR | 10-2001-0054738 | A | | 7/2001 |
| KR | 10-2003-0044512 | A | | 6/2003 |
| KR | 10-2005-0105659 | A | | 11/2005 |
| KR | 10-2006-0037838 | A | | 5/2006 |
| KR | 10-2007-0012937 | A | | 1/2007 |
| KR | 10-2011-0039934 | A | | 4/2011 |
| KR | 10-1249918 | B1 | | 4/2013 |
| KR | 20160033966 | A | * 3/2016 | .......... H01M 10/052 |
| KR | 10-2017-0081449 | A | | 7/2017 |
| KR | 10-2017-0109070 | A | | 9/2017 |

OTHER PUBLICATIONS

Watanabe, Makoto, JP-2010073847-A (machine translation of description), 2010 (Year: 2010).*
Machine translation of KR 20030044512, Jun. 2003.*
Machine translation of CN 203562472U, Apr. 2014.*
International Search Report for PCT/KR2019/001208 dated May 15, 2019.
Supplementary European Search Report mailed in EP 19812033.9 dated Mar. 31, 2021.

* cited by examiner

【FIG. 1】

Conventional Art

CYLINDRICAL SECONDARY BATTERY CONFIGURED TO PREVENT OVERCHARGE THEREOF

TECHNICAL FIELD

This application claims the benefit of priority of Korean Patent Application No. 2018-0061573 filed on May 30, 2018, the disclosure of which is hereby incorporated by reference herein its entirety.

The present invention relates to a cylindrical secondary battery configured to prevent the overcharge thereof, and more particularly to a cylindrical secondary battery configured to have a structure in which a positive electrode tab of a jelly-roll type electrode assembly is coupled to a cap assembly via an adhesion unit.

BACKGROUND ART

Secondary batteries, which can be charged and discharged and which can be repeatedly used, have been used as energy sources for a portable electronic device, a power tool, an electric vehicle, a power storage system, etc., and the demand for high-output and high-capacity secondary batteries has increased.

Based on the shape of a battery case, the secondary batteries are classified into a cylindrical secondary battery having an electrode assembly mounted in a cylindrical metal can, a prismatic secondary battery having an electrode assembly mounted in a prismatic metal can, and a pouch-shaped secondary battery having an electrode assembly mounted in a pouch-shaped case made of an aluminum laminate sheet.

The electrode assembly, which is mounted in the battery case, is a power generating element that is configured to have a structure in which a positive electrode, a separator, and a negative electrode are stacked and that can be charged and discharged. The electrode assembly is classified as a jelly-roll type electrode assembly, which is configured to have a structure in which a sheet type positive electrode and a sheet type negative electrode, to which active materials are applied, are wound in the state in which a separator is disposed between the positive electrode and the negative electrode, or a stacked type electrode assembly, which is configured to have a structure in which a plurality of positive electrodes having a predetermined size and a plurality of negative electrodes having a predetermined size are sequentially stacked in the state in which separators are disposed respectively between the positive electrodes and the negative electrodes. The jelly-roll type electrode assembly has advantages in that it is easy to manufacture the jelly-roll type electrode assembly and in that the jelly-roll type electrode assembly has high energy density per unit weight. For these reasons, the jelly-roll type electrode assembly has been widely manufactured. The jelly-roll type electrode assembly is usually applied to a cylindrical battery.

Generally, in a cylindrical battery, a positive electrode tab of a jelly-roll type electrode assembly is coupled to a cap assembly such that a top cap functions as a positive electrode terminal. The positive electrode tab and the cap assembly are coupled to each other by welding, for example, laser welding.

In the welding process, however, residual foreign matter may be generated, whereby the external appearance of the electrode assembly may be damaged, or the top cap may be distorted.

Therefore, there is a necessity for technology that is capable of solving problems occurring while the positive electrode terminal of the cylindrical secondary battery is formed and of preventing the overcharge of the secondary battery.

In connection therewith, Patent Document 1 discloses a structure in which a plurality of first electrode tabs is disposed under a sub plate and a middle plate so as to be joined both to the sub plate and to the middle plate, wherein internal resistance decreases as the tightness of contact of the junction structure is increased, whereby the possibility of poor welding is reduced.

That is, Patent Document 1 discloses a structure that is capable of reducing the internal resistance of a secondary battery but does not suggest any coupling method other than a welding method, which may generate foreign matter.

Patent Document 2 discloses a structure in which a terminal plate is attached to the upper surface of a conductive adhesive, a negative electrode terminal is electrically connected through a hollow portion formed in the terminal plate, and a negative electrode tab is attached to the lower surface of the conductive adhesive. However, a secondary battery disclosed in Patent Document 2 is configured to have a structure in which the conductive adhesive melts or is deformed, and therefore the connected portions of the negative electrode tab and the negative electrode terminal are separated from each other such that the negative electrode tab and the negative electrode terminal are spaced apart from each other, whereby the electrical connection therebetween is released.

Patent Document 3 discloses a cap assembly configured to have a structure in which the outer circumferential surface of a stack including a top cap and a safety vent, which are sequentially stacked, is wrapped around with a main gasket and in which a current interrupt device, at which the outer circumferential surface of the stack is wrapped around with an auxiliary gasket, is joined to the lower side of the safety vent, wherein the drooping of the main gasket is prevented by the auxiliary gasket.

Patent Document 4 discloses a structure in which, at the innermost side of an electrode formed by winding a positive electrode, a negative electrode, and a porous separator, a wire is wound at least 1.5 turns around a base plate of one of the positive electrode and the negative electrode to form an electrode core, an electrode tab is attached to a region between the winding start part and the 1.5-turn part of the base plate, and the end of the electrode tab is connected to a cap assembly.

However, Patent Document 3 and Patent Document 4 do not suggest a plan that is capable of solving the problems that occur in the process of connecting the electrode terminal and the electrode tab to each other.

Therefore, there is a high necessity for technology that is capable of easily forming a connection structure between a positive electrode tab of a jelly-roll type electrode assembly and a cap assembly in a cylindrical secondary battery, of releasing electrical connection without physically dividing the connection structure, and of preventing the occurrence of problems caused by foreign matter, which may occur during welding, etc.

PRIOR ART DOCUMENT (Patent Document 1) Korean Patent Application Publication No. 2017-0081449

(Patent Document 2) Korean Patent Application Publication No. 2003-0044512

(Patent Document 3) Korean Patent Application Publication No. 2011-0039934
(Patent Document 4) Korean Patent Application Publication No. 2001-0054738

DISCLOSURE

Technical Problem

The present invention has been made in view of the above problems, and it is an object of the present invention to provide a cylindrical secondary battery configured such that it is possible to prevent foreign matter from being generated in the process of electrically connecting an electrode tab and a cap assembly to each other or to prevent the cap assembly from shaking in the above process.

Technical Solution

In accordance with the present invention, the above and other objects can be accomplished by the provision of a cylindrical secondary battery including a jelly-roll type electrode assembly configured to have a structure in which a sheet type positive electrode and a sheet type negative electrode are wound in the state in which a separator is disposed between the positive electrode and the negative electrode, the jelly-roll type electrode assembly including a positive electrode tab, a cylindrical battery case configured to receive the jelly-roll type electrode assembly, the cylindrical battery case having an open upper end, a cap assembly mounted to the open upper end of the cylindrical battery case, and an adhesion unit connecting a lower end surface of the cap assembly to the positive electrode tab of the jelly-roll type electrode assembly, the adhesion unit including an adhesive material, a conductive material, and positive temperature coefficient (PTC) particles.

The adhesive material may be made of at least one selected from the group consisting of a polyester resin, an epoxy resin, a phenol resin, polyvinyl acetate, polyvinyl butyral, and polyester acrylate.

The conductive material may be made of at least one selected from the group consisting of graphite, carbon black, conductive fiber, gold, silver, copper, aluminum, and an alloy of gold, silver, copper, and aluminum.

The PTC particles may be made of silicone rubber or polyethylene.

The conductive material and the PTC particles may be mixed with each other in a ratio of 5:1 to 1:1.

The cylindrical secondary battery may be configured such that charging of the cylindrical secondary battery may be terminated due to an increase in the resistance of the PTC particles when the inner temperature of the cylindrical secondary battery increases.

Coupling between the lower end surface of the cap assembly and the adhesion unit and between the positive electrode tab and the adhesion unit may be maintained in the state in which the charging is terminated.

A venting member may be located at the lower end of the cap assembly, and the cap assembly may be configured to have a structure from which a PTC element and a current interrupt device (CID) filter are omitted.

The positive electrode tab of the jelly-roll type electrode assembly may be coupled to the lower surface of a venting member of the cap assembly via the adhesion unit.

The PTC particles may have a glass transition temperature higher than the temperature at which the charging is terminated.

The adhesive material may have a glass transition temperature lower than the glass transition temperature of the PTC particles.

BEST MODE

A cylindrical secondary battery according to the present invention may include a jelly-roll type electrode assembly configured to have a structure in which a sheet type positive electrode and a sheet type negative electrode are wound in the state in which a separator is disposed between the positive electrode and the negative electrode, a cylindrical battery case configured to receive the jelly-roll type electrode assembly, and a cap assembly mounted to the open upper end of the cylindrical battery case, wherein the lower end surface of the cap assembly may be connected to a positive electrode tab of the jelly-roll type electrode assembly via an adhesion unit, and the adhesion unit may include an adhesive material, a conductive material, and positive temperature coefficient (PTC) particles.

That is, in the present invention, the adhesion unit is used in order to couple the lower end surface of the cap assembly and the positive electrode tab of the jelly-roll type electrode assembly to each other, and the adhesion unit includes an adhesive material, a conductive material, and PTC particles.

Specifically, the adhesion unit of the present invention may include an adhesive material configured to increase the force of coupling between the positive electrode tab and the cap assembly while maintaining the shape of the adhesion unit in a normal state, a conductive material configured to serve as an electrical connection path between the positive electrode tab and the cap assembly, and PTC particles, the resistance of which abruptly increases when the inner temperature of the secondary battery increases.

As described above, in the cylindrical secondary battery according to the present invention, the adhesion unit, which includes the adhesive material, is added to the lower surface of the cap assembly, to which the positive electrode tab is coupled, without using a conventionally used welding method, such as laser welding, in order to achieve electrical connection between the positive electrode tab and the cap assembly, which functions as a positive electrode terminal.

Consequently, it is possible to prevent the occurrence of a problem in which foreign matter is separated from the electrode assembly as the result of using laser welding for the cylindrical secondary battery, as in the conventional art, whereby the separator is damaged or reacts with an electrolytic solution.

The adhesive material is not particularly restricted, as long as the adhesive material is made of a material that is capable of increasing the force of coupling between the positive electrode tab and the cap assembly. For example, the adhesive material may be made of at least one selected from the group consisting of a polyester resin, an epoxy resin, a phenol resin, polyvinyl acetate, polyvinyl butyral, and polyester acrylate.

The conductive material serves as an electrical connection path between the positive electrode tab and the cap assembly. The conductive material is not particularly restricted, as long as the conductive material is made of a material that exhibits high electrical conductivity. For example, the conductive material may be made of at least one selected from the group consisting of graphite, carbon black, conductive fiber, such as carbon fiber or metal fiber, gold, silver, copper, aluminum, and an alloy of gold, silver, copper, and aluminum.

The PTC particles have properties in which the resistance of the PTC particles is relatively low at normal temperature, whereby the PTC particles easily transmit current, but when the temperature of the battery increases or the inner temperature of the battery increases due to overcurrent flowing in the battery, the resistance of the PTC particles abruptly increases to about 1,000 times to 10,000 times or more the resistance in the normal state.

According to Ohm's law, it can be seen that, when resistance increases in the state in which the current value is uniform, voltage increases in proportion to the increased value of the resistance. When the resistance of the PTC particles abruptly increases, the voltage of the secondary battery increases in proportion thereto. When the charge end voltage is reached, therefore, charging of the secondary battery is terminated. Consequently, it is possible to interrupt overcharge of the secondary battery, whereby it is possible to prevent explosion or combustion of the secondary battery due to a continuous increase in the temperature of the secondary battery.

The PTC particles are not particularly restricted, as long as the PTC particles are made of a material that has a low resistance property at normal temperature but has a high resistance property at high temperature. For example, the PTC particles may be made of silicone rubber or polyethylene.

In a concrete example, the conductive material and the PTC particles may be mixed with each other in a ratio of 5:1 to 1:1.

In the case in which the mixing ratio of the PTC particles to the conductive material is less than $\frac{1}{5}$, a resistance increase property is not remarkably apparent, whereby it is difficult to obtain a desired resistance increase effect, which is undesirable. In the case in which the content of the PTC particles is greater than the content of the conductive material, electrical conductivity becomes an issue, which is also undesirable.

In the cylindrical secondary battery according to the present invention, when the inner temperature of the battery increases due to overcharge of the battery, the voltage of the battery increases in proportion to an increase in the resistance of the PTC particles. As a result, the voltage of the battery reaches a charge end voltage, whereby charging is terminated. That is, unlike the conventional art, in which the adhesion unit, interposed between the positive electrode tab and the cap assembly, melts, whereby the positive electrode tab and the cap assembly are physically separated from each other, coupling between the lower end of the cap assembly and the adhesion unit and between the positive electrode tab and the adhesion unit may be maintained in the state in which the charging is terminated according to the present invention.

In a concrete example, a venting member may be located at the lower end of the cap assembly, and the cap assembly may be configured to have a structure from which a PTC element and a current interrupt device are omitted. In the present invention, therefore, a cap assembly having a small thickness, i.e. a thin cap assembly, may be used in order to prevent the volume corresponding to the thicknesses of the PTC element and the current interrupt device from remaining as dead space. That is, the height of the jelly-roll type electrode assembly may be increased as the result of reducing the thickness of the cap assembly, whereby it is possible to increase the height of the electrode assembly while maintaining the overall length of the cylindrical secondary battery. Consequently, it is possible to provide a high-capacity secondary battery.

Meanwhile, the cylindrical secondary battery according to the present invention includes a venting member configured to discharge the gas generated in the battery case when the inner pressure of the battery increases due to the gas. The venting member may be configured to have a structure in which a notch is formed in the venting member such that the venting member easily ruptures to discharge gas, may be configured to have a structure in which the venting member is generally flat, or may be configured to have a structure in which the venting member is concave downwards.

In the cylindrical secondary battery having the above structure, the venting member may be located under the top cap, and the positive electrode tab may be connected to the lower surface of the venting member via the adhesion unit through an insulation member located above the jelly-roll type electrode assembly.

Preferably, the shape of the PTC particles is maintained while the properties of the PTC particles are not changed until the voltage of the secondary battery reaches a charge end voltage as the result of an increase in the inner temperature of the secondary battery. The glass transition temperature of the PTC particles may be higher than the temperature at which the charging is terminated.

Meanwhile, in consideration of the fact that it is possible to obtain an effect in which at least a portion of the adhesive material may melt even before the voltage of the secondary battery reaches the charge end voltage, whereby the distance between the components of the conductive material may increase, and therefore resistance may increase, the glass transition temperature of the adhesive material may be lower than the temperature at which the charging is terminated.

Hereinafter, preferred embodiments of the present invention will be described in detail with reference to the accompanying drawings such that the preferred embodiments of the present invention can be easily implemented by those skilled in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part in the specification, not only may the one part be directly connected to the another part, but also, the one part may be indirectly connected to the another part via a further part. In addition, that a certain element is included does not mean that other elements are excluded, but means that such elements may be further included unless mentioned otherwise.

Embodiments of the present invention will be described in detail with reference to the accompanying drawings.

Figure 1:
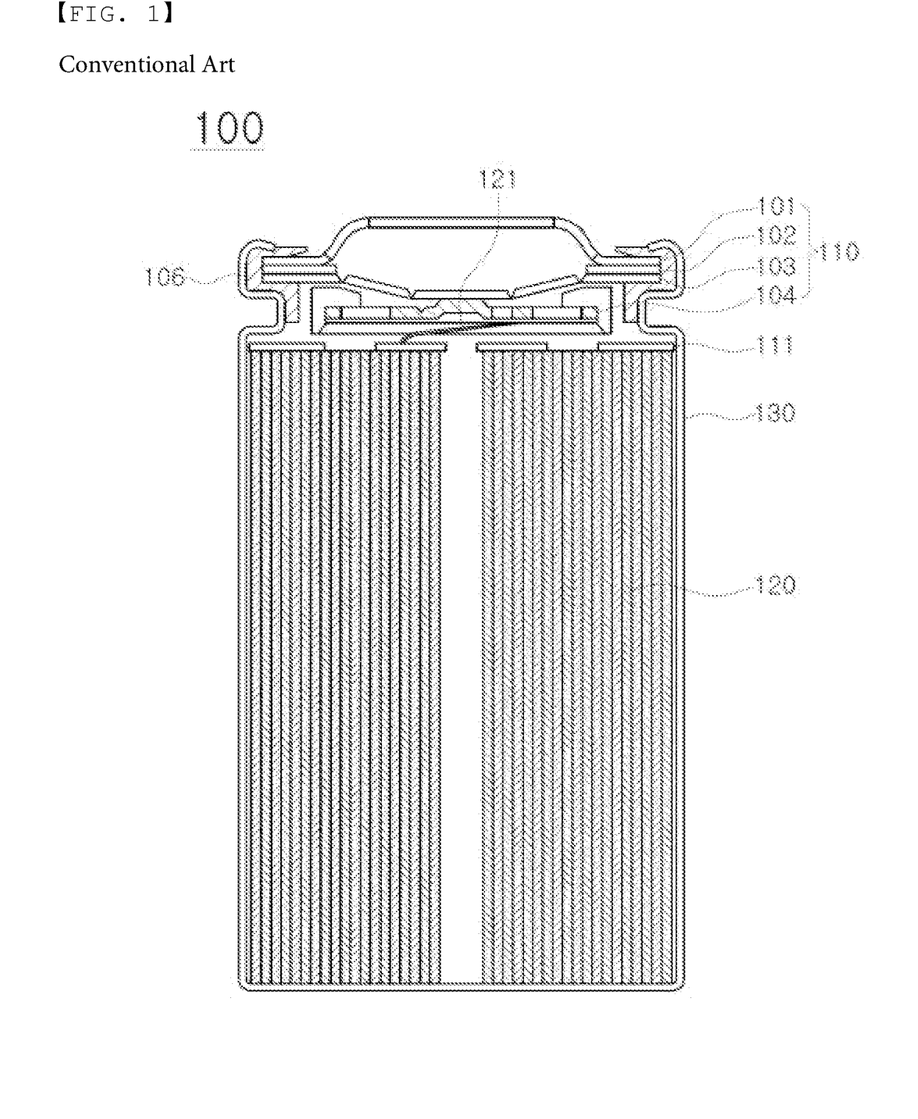
FIG. 1 is a vertical sectional view showing a conventional general cylindrical secondary battery.

FIG. 1 is a vertical sectional view showing a conventional general cylindrical secondary battery.

Referring to FIG. 1, the cylindrical secondary battery 100 includes a battery case 130, in which a jelly-roll type electrode assembly 120 is received, and a cap assembly 110 located at the upper part of the battery case 130. A top cap 101 is located at the upper end of the cap assembly 110, and a PTC element 102, configured to interrupt the flow of current at high temperature, a safety vent 103, configured to discharge high-pressure gas, and a current interrupt device 104, configured to interrupt the flow of current when the inner pressure of the battery increases, are sequentially stacked under the top cap 101.

At the contact between the cap assembly 110 and the battery case is disposed a gasket 106 configured to secure the sealing force of the secondary battery, and a positive electrode tab 121 of the jelly-roll type electrode assembly is coupled to the lower surface of the current interrupt device 104 by welding.

Above the jelly-roll type electrode assembly 120 may be located an insulation member 111 configured to prevent contact between the positive electrode tab 121 and the battery case 130.

Figure 2:
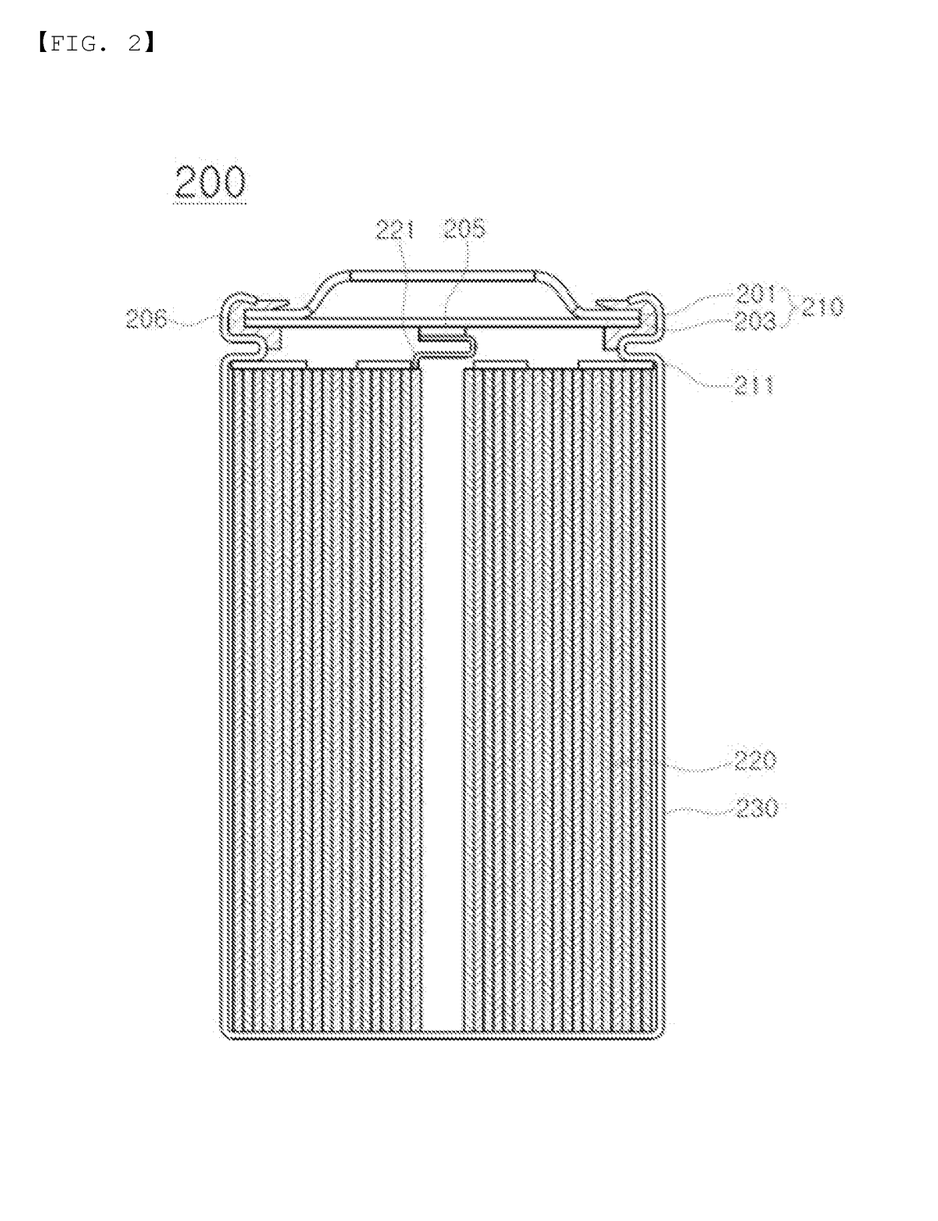
FIG. 2 is a vertical sectional view showing a cylindrical secondary battery according to an embodiment of the present invention.

FIG. 2 is a vertical sectional view showing a cylindrical secondary battery according to an embodiment of the present invention.

Referring to FIG. 2, the cylindrical secondary battery 200 includes a battery case 230, in which a jelly-roll type electrode assembly 220 is received, a cap assembly 210, and a gasket 206 located between the cap assembly 210 and the battery case 230, the gasket being configured to secure the sealing force of the battery case.

A top cap 201 is located at the upper part of the cap assembly 210, and a venting member 203, configured to interrupt the flow of current when the inner pressure of the battery increases, is located under the top cap 201. That is, the cap assembly 210 of the cylindrical secondary battery 200 is configured to have a structure in which the PTC element 102 and the current interrupt device 104 are omitted from the structure of the cylindrical secondary battery 100.

A positive electrode tab 221 of the jelly-roll type electrode assembly 220 may be coupled to the lower surface of the venting member 203 via an adhesion unit 205, and the venting member 203 may be connected to the top cap 201 such that the top cap 201 functions as a positive electrode terminal.

Above the jelly-roll type electrode assembly 220 may be located an insulation member 211 configured to prevent contact between the positive electrode tab 221 and the battery case 230.

Figure 3:
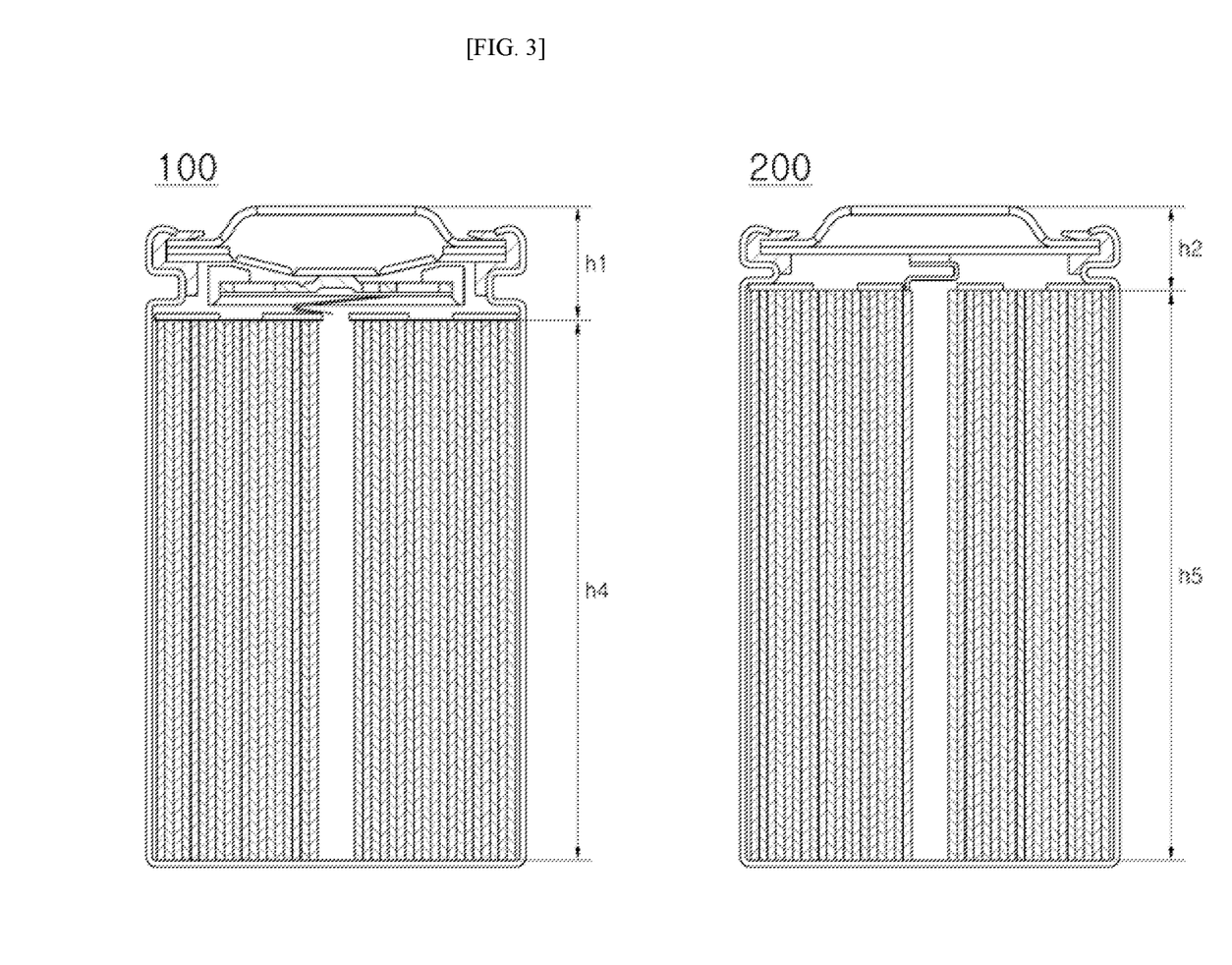
FIG. 3 is a vertical sectional view showing a comparison of the heights of electrode assemblies included in the cylindrical secondary batteries of FIGS. 1 and 2.

FIG. 3 is a vertical sectional view showing a comparison of the heights of the electrode assemblies included in the cylindrical secondary batteries of FIGS. 1 and 2.

Referring to FIG. 3, the cylindrical secondary battery 200 is configured to have a structure in which the PTC element 102 and the current interrupt device 104 are omitted from the cylindrical secondary battery 100.

Consequently, the thickness h2 of the cap assembly of the cylindrical secondary battery 200 is less than the thickness h1 of the cap assembly of the cylindrical secondary battery 100.

In the case in which the thickness of the cap assembly is reduced, as described above, the height h5 of the electrode assembly of the cylindrical secondary battery 200 becomes greater than the height h4 of the electrode assembly of the cylindrical secondary battery 100, on the assumption that the overall heights of the cylindrical secondary batteries are equal to each other.

Figure 4:
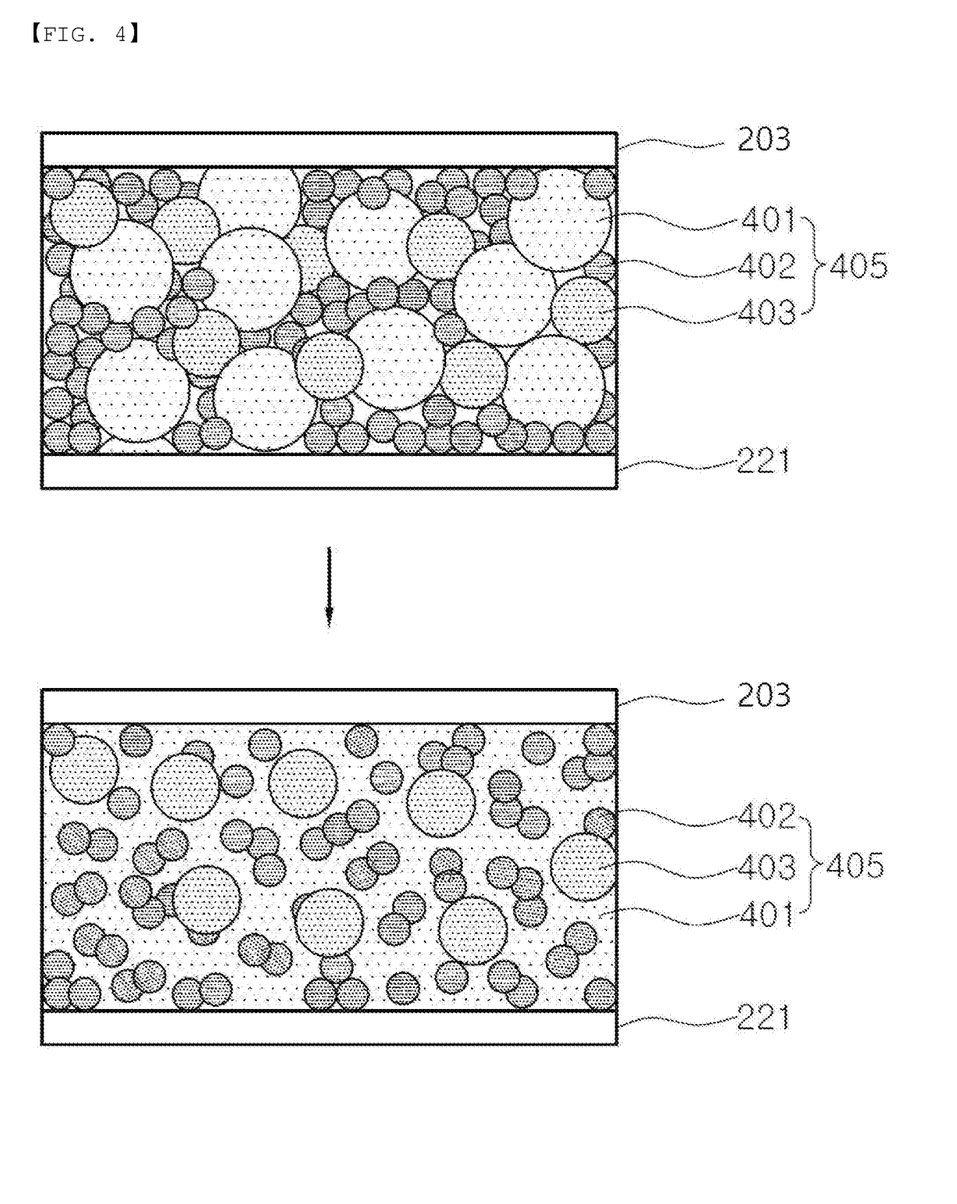
FIG. 4 is an enlarged view showing the states before and after an adhesion unit is deformed.
Figure 5:
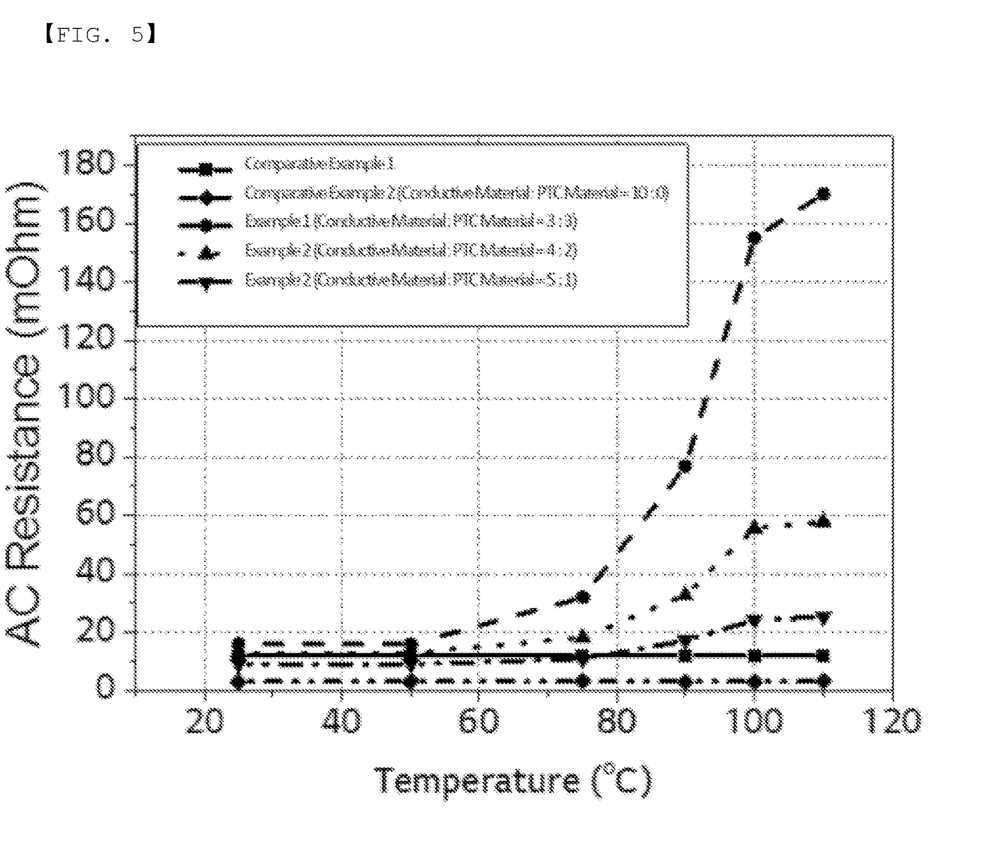
FIG. 5 is a graph showing the results of an experimental example.

FIG. 4 is an enlarged view showing the states before and after the adhesion unit shown in FIG. 2 is deformed.

Referring to FIG. 4, the upper surface of an adhesion unit 405 is coupled to the venting member 203, and the lower surface of the adhesion unit is coupled to the positive electrode tab 221.

The adhesion unit 405 includes an adhesive material 401, a conductive material 402, and PTC particles 403.

In a normal state, coupling between the venting member 203 and the positive electrode tab 221 via the adhesion unit 405 is achieved, whereby electrical connection through the conductive material 402 is achieved. When the adhesive material 401 melts due to an increase in the temperature of the battery and thus the distance between the components of the conductive material 402 increases, however, resistance may increase. In the case in which the temperature further increases, the resistance of the PTC particles 403 abruptly increases, whereby the voltage of the secondary battery increases to a charge end voltage. Consequently, the flow of current may be interrupted.

Alternatively, in the case in which the resistance of the PTC particles 403 increases even though the adhesive material 401 does not melt, the flow of current may be interrupted due to the increase of voltage.

Hereinafter, the present invention will be described with reference to the following examples. These examples are provided only for easier understanding of the present invention and should not be construed as limiting the scope of the present invention.

Example 1

Based on the total weight of an adhesion unit, 40 wt % of polyester resin, as an adhesive material, 30 wt % of silver, as a conductive material, and 30 wt % of polyethylene, as PTC particles, were mixed with NMP, and the same was dried to manufacture a paste-phase adhesion unit.

The adhesion unit thus manufactured was added to a positive electrode tab of a cylindrical secondary battery, configured to have the structure shown in FIG. 2, and to the lower end of a cap assembly of the cylindrical secondary battery to achieve electrical connection between the positive electrode tab and venting member.

Example 2

A paste-phase adhesion unit was manufactured in the same manner as in Example 1, except that 40 wt % of silver, as a conductive material, and 20 wt % of polyethylene, as PTC particles, were used, unlike Example 1, and then a cylindrical secondary battery having the adhesion unit added thereto was manufactured.

Example 3

A paste-phase adhesion unit was manufactured in the same manner as in Example 1, except that 50 wt % of silver, as a conductive material, and 10 wt % of polyethylene, as PTC particles, were used, unlike Example 1, and then a cylindrical secondary battery having the adhesion unit added thereto was manufactured.

Comparative Example 1

A cylindrical secondary battery configured to have the structure shown in FIG. 1 was prepared, and a cylindrical secondary battery configured to have a structure in which a positive electrode tab and a cap assembly were coupled to each other by welding was manufactured.

Comparative Example 2

A paste-phase adhesion unit was manufactured in the same manner as in Example 1, except that 60 wt % of silver, as a conductive material, was used and no PTC particles were used, unlike Example 1, and then a cylindrical secondary battery having the adhesion unit added thereto was manufactured.

Experimental Example

Measurement of Resistance of Adhesion Unit

Variation in the resistance of a secondary battery depending on temperature was measured using the cylindrical secondary batteries manufactured according to Examples 1 to 3 and Comparative Examples 1 and 2, and the results are shown in FIG. 6.

Measurement was performed at temperatures of 25° C., 50° C., 75° C., 90° C., 100° C., and 110° C.

Referring to FIG. 6, it can be seen that, in the case in which the content of the PTC particles was 20% higher than the content of the conductive material, resistance abruptly increased as the temperature increased to 75° C. or higher.

Also, in the case of Example 1, resistance increased when the temperature exceeded 50° C., and the increase in the resistance of the adhesion unit depending on the change of temperature generally became steeper as the content of the PTC particles is increased.

In the case of Comparative Example 1, in which no PTC particles were added, and Comparative Example 2, in which the positive electrode tab was attached by welding, an increase in resistance depending on changed in temperature was not apparent.

In the case in which the inner temperature of the cylindrical secondary battery increases as the cylindrical secondary battery reaches an abnormal state, therefore, it is expected that the resistance of the PTC particles increases, the resistance of the adhesion unit increases, and the voltage of the cylindrical secondary battery reaches a charge end voltage, whereby it is possible to prevent the cylindrical secondary battery from exploding or catching fire due to overcharge thereof.

Those skilled in the art to which the present invention pertains will appreciate that various applications and modifications are possible based on the above description, without departing from the scope of the present invention.

DESCRIPTION OF REFERENCE NUMERALS 100, 200: Cylindrical secondary batteries
101, 201: Top caps
102: PTC element
103: Safety vent
104: Current interrupt device
203: Venting member
205, 405: Adhesion units
106, 206: Gaskets
110, 210: Cap assemblies
111, 211: Insulation members
120, 220: Jelly-roll type electrode assemblies
121, 221: Positive electrode tabs
130, 230: Battery cases
h1, h2: Thicknesses of cap assemblies
h4, h5: Heights of electrode assemblies
401: Adhesive material
402: Conductive material
403: PTC particles

INDUSTRIAL APPLICABILITY

As is apparent from the above description, in a cylindrical secondary battery according to the present invention, electrical connection between an electrode assembly and an electrode terminal of the battery is achieved by an adhesion unit including an adhesive material, whereby it is possible to prevent foreign matter from being generated in the process of connecting the electrode assembly and the electrode terminal to each other.

In addition, the cylindrical secondary battery is configured to have a structure in which charging of the battery is terminated as voltage increases to a charge end voltage or higher in the state in which the connection between the electrode assembly and the electrode terminal is maintained at the adhesion unit. Consequently, it is possible to omit a space necessary to separate the electrode assembly and the electrode terminal from each other, whereby it is possible to increase the capacity of the battery in proportion to the omitted space.

In addition, it is possible to prevent a change in the position of a cap assembly, whereby it is possible to reduce a battery defect rate.

The invention claimed is:

1. A cylindrical secondary battery comprising:
    a jelly-roll type electrode assembly configured to have a structure in which a sheet type positive electrode and a sheet type negative electrode are wound in a state in which a separator is disposed between the positive electrode and the negative electrode, jelly-roll type electrode assembly including a positive electrode tab;
    a cylindrical battery case configured to receive the jelly-roll type electrode assembly, the cylindrical battery case having an open upper end;
    a cap assembly mounted to the open upper end of the cylindrical battery case, the cap assembly including a venting member; and
    an adhesion unit directly connecting a lower end surface of the venting member to the positive electrode tab of the jelly-roll type electrode assembly without welding, the adhesion unit including an adhesive material, a conductive material, and positive temperature coefficient (PTC) particles.

2. The cylindrical secondary battery according to claim 1, wherein the adhesive material is made of at least one selected from a group consisting of a polyester resin, an epoxy resin, a phenol resin, polyvinyl acetate, polyvinyl butyral, and polyester acrylate.

3. The cylindrical secondary battery according to claim 1, wherein the conductive material is made of at least one selected from a group consisting of graphite, carbon black, conductive fiber, gold, silver, copper, aluminum, and an alloy of gold, silver, copper, and aluminum.

4. The cylindrical secondary battery according to claim 1, wherein the PTC particles are made of silicone rubber or polyethylene.

5. The cylindrical secondary battery according to claim 1, wherein the conductive material and the PTC particles are mixed with each other in a ratio of 5:1 to 1:1.

6. The cylindrical secondary battery according to claim 1, wherein the cylindrical secondary battery is configured such that charging of the cylindrical secondary battery is terminated due to an increase in resistance of the PTC particles when an inner temperature of the cylindrical secondary battery increases.

7. The cylindrical secondary battery according to claim 6, wherein coupling between the lower end surface of the venting member and the adhesion unit and between the positive electrode tab and the adhesion unit is maintained in a state in which the charging is terminated.

8. The cylindrical secondary battery according to claim 1, wherein the cap assembly is configured to have a structure from which a PTC element and a current interrupt device (CID) filter are omitted.

9. The cylindrical secondary battery according to claim 6, wherein the PTC particles have a glass transition temperature higher than a temperature at which the charging is terminated.

10. The cylindrical secondary battery according to claim 6, wherein the adhesive material has a glass transition temperature lower than a temperature at which the charging is terminated.

11. The cylindrical secondary battery according to claim 1, wherein the adhesion unit electrically connects the lower end surface of the venting member to the positive electrode tab of the jelly-roll type electrode assembly,
wherein the conductive material and the PTC particles are mixed with each other in a ratio of 5:1 to 1:1, and
wherein the cap assembly is configured to have a structure from which a PTC element and a current interrupt device (CID) filter are omitted.

12. The cylindrical secondary battery according to claim 1, wherein the positive electrode tab and the lower end surface of the venting member are not in direct contact with each other.

* * * * *